United States Patent [19]

Barlics

[11] Patent Number: 4,550,894
[45] Date of Patent: Nov. 5, 1985

[54] TRIVET

[76] Inventor: John J. Barlics, 7 Denver Blvd., North Edison, N.J. 08820

[21] Appl. No.: 439,589

[22] Filed: Nov. 5, 1982

[51] Int. Cl.⁴ ............................................. F16M 13/00
[52] U.S. Cl. ........................................ 248/346; 248/1
[58] Field of Search ............... 248/117.1, 117.2, 117.3, 248/117.4, 146, 346, 346.1, 362; 277/233

[56] References Cited

U.S. PATENT DOCUMENTS

| D. 216,270 | 12/1969 | Beckman. | |
|---|---|---|---|
| 2,778,589 | 1/1957 | Peterson | 248/117.3 |
| 2,910,264 | 10/1959 | Lindenberger | 248/362 |
| 3,094,235 | 6/1963 | Luning. | |
| 3,967,803 | 7/1976 | Kienlen et al.. | |
| 4,253,630 | 3/1981 | Rigg | 248/346 |

FOREIGN PATENT DOCUMENTS

| 165987 | 6/1904 | Fed. Rep. of Germany. | |
|---|---|---|---|
| 655551 | 6/1935 | Fed. Rep. of Germany | 277/233 |
| 303989 | 3/1955 | Switzerland | 248/362 |

OTHER PUBLICATIONS

Gifts and Decorative Accessories, p. 77, Apr. 13, 1973.

Primary Examiner—William H. Schultz
Attorney, Agent, or Firm—Lerner, David, Littenberg, Krumholz & Mentlik

[57] ABSTRACT

A trivet is made from a continuous ring having an opening which forms a dead air space between an object supported by the trivet and an underlying structure, such as a table or counter top. The trivet is also preferably made from a heat-resistant, anti-slip material, such as silicone rubber, so that it can be used in vehicles, such as trains, boats and automobiles.

3 Claims, 4 Drawing Figures

TRIVET

FIELD OF THE INVENTION

The present invention relates to a trivet. As used herein, the term "trivet" shall be used to denote any type of support adapted to be placed under a hot dish, plate or other object in order to protect an underlying table, counter top or similar structure.

BACKGROUND OF THE INVENTION

In the past, there have been two basic types of trivets. One type is a solid plate or dish made from a heat-resistant material. Because of its solid construction, this type of trivet inhibits air from flowing through the trivet and hence between the hot object and the underlying support structure. The other type of trivet has an open construction designed to permit air to flow freely therethrough between the hot object and the underlying support structure.

SUMMARY OF THE INVENTION

The present invention relates to a new and improved type of trivet having a body which includes an opening extending therethrough and a continuous sidewall completely surrounding the opening. The sidewall has an upper sealing surface which forms a substantially air-tight seal with a hot object supported by the sidewall and a lower sealing surface which forms a substantially air-tight seal with a support structure on which the sidewall rests. The upper and lower sealing surfaces cooperate with the sidewall and the opening to create a dead air space between the hot object and the support structure. The dead air space has a thermal insulating effect, because it inhibits heat transfer due to convection from the hot object to the support structure.

In order to reduce the contact area between the upper sealing surface and the hot object and thereby reduce the heat transferred by conduction from the hot object to the trivet and hence the underlying support structure, the upper sealing surface can be provided with one or more depressions. By making the entire sidewall from a heat-resistant material, such as silicone rubber, which also has good thermal insulating properties, the heat transferred due to conduction from the hot object to the support structure can be further reduced.

In one embodiment, the sidewall is in the shape of a ring which has a trapezoidal cross-sectional shape selected such that the upper sealing surface has a width which is less than the width of the lower sealing surface. Such a shape increases the stability of the trivet when it is in use, thereby inhibiting movement of the hot object supported by the trivet. Movement of the hot object can be further inhibited by making at least the upper and lower sealing surfaces from anti-slip material, such as silicone rubber. When so constructed, the trivet is especially adapted for use in vehicles, such as boats, trains and automobiles.

The trivet can be manufactured in various different sizes to accomodate a variety of hot objects, such as cups, glasses, pots, pans, baking sheets, etc. Thus, in another embodiment, different size trivets can be arranged concentrically or otherwise to form a composite trivet.

BRIEF DESCRIPTION OF THE DRAWINGS

For a more complete understanding of the present invention, reference is made to the following detailed description of two exemplary embodiments considered in conjunction with the accompanying drawings, in which.

DESCRIPTION OF THE EXEMPLARY EMBODIMENTS

Figure 1:
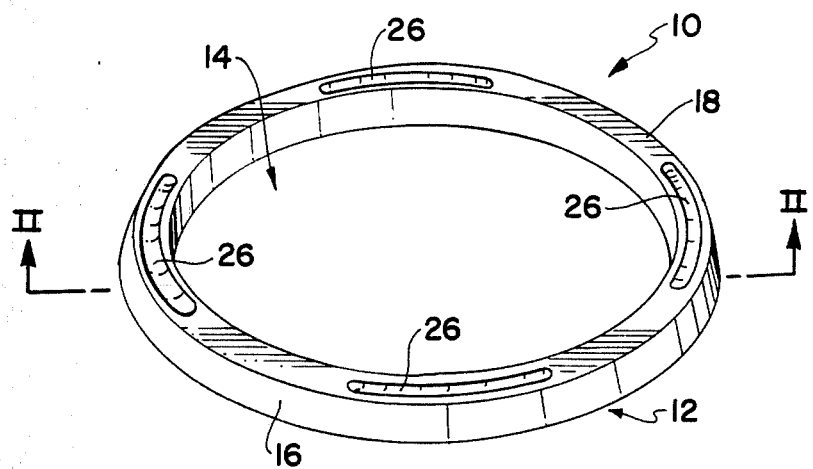
FIG. 1 is a perspective view of one embodiment of a trivet constructed in accordance with the present invention.
Figure 2:
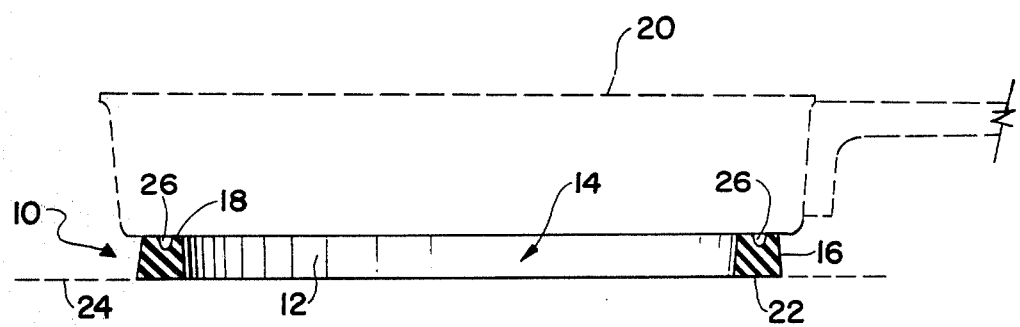
FIG. 2 is a cross-sectional view, taken along line II—II in FIG. 1 and looking in the direction of the arrows, of the trivet illustrated in FIG. 1, environmental structure being shown in phantom.

Referring to FIGS. 1 and 2, there is shown a trivet 10 which is formed from a ring-like body 12 having an opening 14 extending therethrough and a continuous sidewall 16 which completely surrounds the opening 14. The sidewall 16 includes an upper sealing surface 18 adapted to form a substantially air-tight seal with a hot object 20, such as a pan, supported by the sidewall 16. Similarly, a lower sealing surface 22 forms a substantially air-tight seal with a support structure 24, such as a table or counter top. Thus, when the trivet 10 is in use as shown in FIG. 2, the upper and lower sealing surfaces 18, 22, respectively, cooperate with the sidewall 16 and the opening 14 to create a substantially dead air space between the hot object 20 and the support structure 24. The dead air space has a thermal insulating effect, because it reduces the heat transfer due to convection from the hot object 20 to the support structure 24.

The upper sealing surface 18 is provided with a plurality of arcuate depressions 26. The depressions 26 reduce the contact area between the upper sealing surface 18 and the hot object 20 to thereby reduce the heat transferred due to conduction from the hot object 20 to the trivet 10 and hence the support structure 24. The heat transferred due to conduction can be further reduced by making the trivet from a heat-resistant material, such as silicone rubber.

Because silicone rubber is also an anti-slip material, when the trivet 10 is made from such a material, the trivet 10 is inhibited from slipping or otherwise moving relative to the support structure 24. Similarly, the hot object 20 is inhibited from slipping or otherwise moving relative to the trivet 10. To further stabilize the hot object 20 while it rests on the trivet 10, the sidewall 16 has a trapezoidal cross-sectional shape selected such that the lower sealing surface 22 is wider than the upper sealing surface 18.

Figure 3:
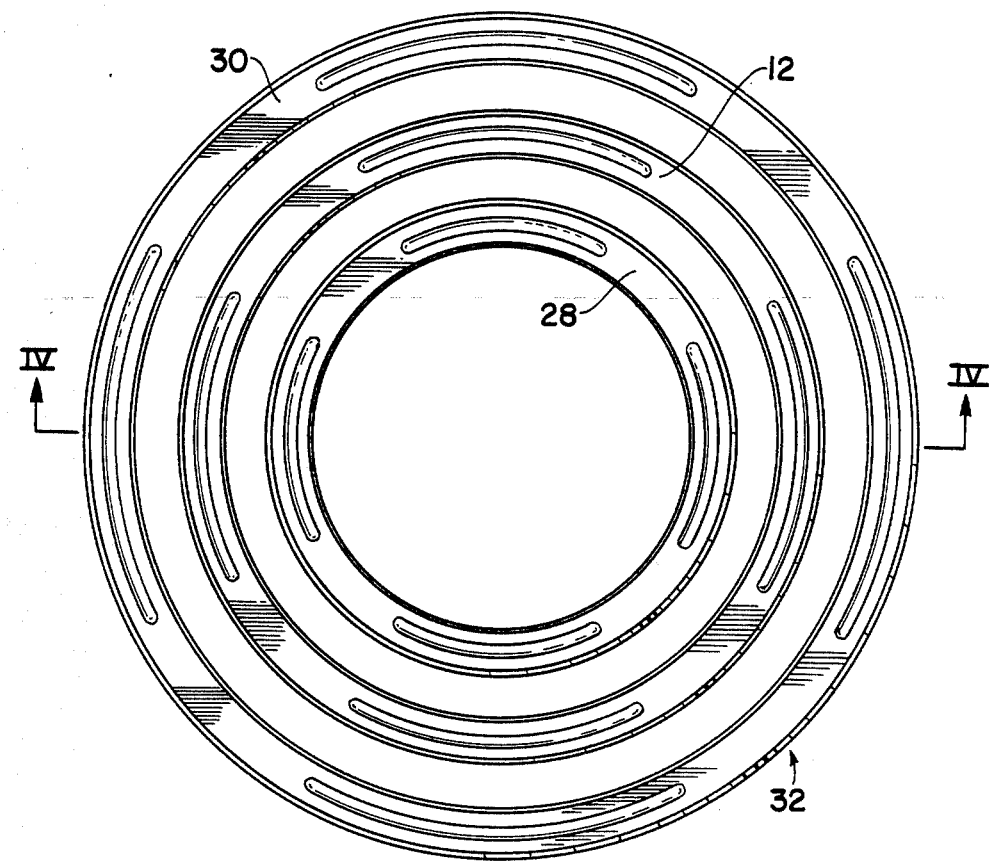
FIG. 3 is a top view of another embodiment of a trivet constructed in accordance with the present invention.
Figure 4:
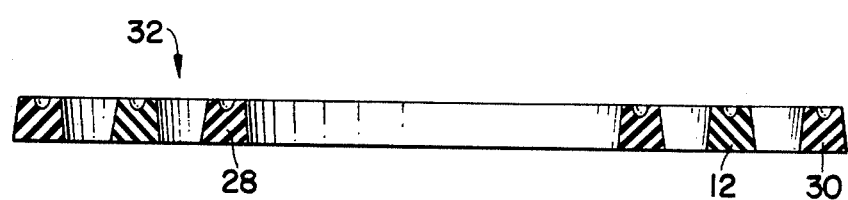
FIG. 4 is a cross-sectional view, taken along line IV—IV in FIG. 3 and looking in the direction of the arrows, of the trivet illustrated in FIG. 3.

Referring now to FIGS. 3 and 4, the ring-like body 12 is used in combination with a smaller ring-like body 28 and a larger ring-like body 30 to form a composite trivet 32. Except for their diameters, the ring-like bodies 28, 30 are essentially identical to the ring-like body 12.

It will be understood that the embodiments described herein are merely exemplary and that a person skilled in the art may make many variations and modifications without departing from the spirit and scope of the invention. All such modifications and variations are intended to be included within the scope of the invention as defined in the appended claims.

I claim:

1. A trivet, comprising a plurality of coaxially arranged bodies made from heat-resistant material, each body being ring-shaped and including an opening extending therethrough and a continuous sidewall completely surrounding said opening, said sidewall having an upper sealing surface of a first width for forming a substantially air-tight seal with a hot object supported by said sidewall, a lower sealing surface of a second width, which is greater than said first width, for forming a substantially air-tight seal with a support structure on which said sidewall rests, and a trapezoidal cross-sectional shape and said sidewall being substantially non-collapsible, whereby said upper and lower sealing surfaces cooperate with said sidewalls and said openings to create dead air spaces between the hot object and the support structure.

2. A method of thermally insulating a hot object from an underlying support structure, comprising the steps of providing a trivet which includes a ring-shaped body made from heat-resistant material and having an opening extending therethrough and a continuous sidewall completely surrounding said opening, said sidewall having an upper sealing surface of a first width, a lower sealing surface of a second width, which is greater than said first width, and a trapezoidal cross-sectional shape and said sidewall being substantially non-collapsible, and interposing said trivet between the hot object and the support structure such that said upper sealing surface forms a substantially air-tight seal with the hot object and said lower sealing surface forms a substantially air-tight seal with the support structure, whereby said upper and lower sealing surfaces cooperate with said sidewall and said opening to create a dead air space between the hot object and the support structure.

3. A method of thermally insulating a hot object from an underlying support structure, comprising the steps of providing a trivet which includes a plurality of coaxially arranged bodies made from heat-resistant material, each body being ring-shaped and having an opening extending therethrough and a continuous sidewall completely surrounding said opening, said sidewall having an upper sealing surface of a first width, a lower sealing surface of a second width, which is greater than said first width, and a trapezoidal cross-sectional shape and said sidewall being substantially non-collapsible, and interposing said trivet between the hot object and the support structure such that said upper sealing surfaces form a substantially air-tight seal with the hot object and said lower sealing surfaces form a substantially air-tight seal with the support structure, whereby said upper and lower sealing surfaces cooperate with said sidewalls and said openings to create dead air spaces between the hot object and the support structure.

* * * * *